United States Patent [19]
Dahlmans et al.

[11] 3,919,048
[45] Nov. 11, 1975

[54] INSOLUBLE CARRIER-BOUND ENZYMES

[75] Inventors: Johannes J. Dahlmans, Maastricht; Theo A. J. Meijerink, Geleen, both of Netherlands

[73] Assignee: Stamicarbon B.V., Geleen, Netherlands

[22] Filed: Apr. 8, 1974

[21] Appl. No.: 459,236

[30] Foreign Application Priority Data
Apr. 10, 1973 Netherlands.................... 7304956

[52] U.S. Cl. .............. 195/63; 195/68; 195/DIG. 11
[51] Int. Cl.²........................................ C07G 7/02
[58] Field of Search................. 195/63, 68, DIG. 11

[56] References Cited
UNITED STATES PATENTS
3,639,558    2/1972    Csizmas et al................. 195/68 X
3,843,446    10/1974   Vieth et al..................... 195/68

OTHER PUBLICATIONS

Silman, et al., Some Water-Insoluble Papain Derivatives. Biopolymers, Vol. 4, 1966 (pp. 441–448).

*Primary Examiner*—David M. Naff
*Attorney, Agent, or Firm*—Cushman, Darby & Cushman

[57] ABSTRACT

Insoluble enzyme complexes are prepared by chemically bonding enzymes to natural sponge. The enzyme can be either directly bonded to the sponge, or the sponge can be first modified with an appropriate chemical reagent, such as a cyclic dicarboxylic acid anhydride, prior to chemical bonding with the enzyme.

8 Claims, No Drawings

INSOLUBLE CARRIER-BOUND ENZYMES

The invention concerns the preparation of insoluble enzyme complexes by binding enzymes to a natural sponge carrier.

Enzymes have been widely used for industrial purposes. Typical uses are described in the *Kirk-Othmer Encyclopedia of Chemical Technology*, 2d Ed., Vol. 8, page 173 (1965). The insoluble enzyme complexes represent a recent class of heterogeneous catalysts having very specific properties. They find wide application in the pharmaceutical industry, various food industry and industrial processes, environmental control, as well as in research. Since these water insoluble enzyme complexes can be easily removed from the process systems in which they are used, the enzymatic reactions can be readily controlled. In general, the insoluble enzyme complexes are more stable under the reaction conditions in which they are used than their soluble forms. Because of their insoluble nature, however, the enzyme complexes are more suitable for application in continuous reactors.

The present methods for binding enzymes to carriers include: 1. Adsorption. 2. Entrapment or inclusion of the enzymes in a gel-network, in particular a hydrophilic gel network, whereby the enzymes are restrained physically in a gel matrix. 3. Covalently bonding the enzyme protein to the carrier by means of various functional groups without substantially reducing the reactivity of the enzyme. 4. Cross-linking the enzyme proteins by means of bi-functional reagents thereby insolubilizing them.

The use of various types of carriers has been proposed, both inorganic and organic. In Biopolymers 4, 441-448 (1966), the use of collagen sponge is proposed for binding papain. However, collagen sponge has the disadvantage of dissolving at a pH of 3-4 and gelatinizing in water at elevated temperatures. It is also reported that mechanical disintegration of the collagen sponge-papain conjugate occurs after addition of cysteine and EDTA, and the conjugate become partly soluble upon activation of the bound papain.

It has now been surprisingly and unexpectedly discovered that insoluble enzyme complexes having outstanding properties can be prepared by binding one or more enzymes to an insoluble carrier comprising natural sponge.

In particular, it has been found that natural (commercial) sponge, hereinafter simply called sponge, possesses various properties making it highly suitable for use as an enzyme carrier, as a result of which it offers advantages as compared to the prior art carriers. Natural sponge is particularly suitable as an enzyme carrier for the following reasons: 1. Because of the great elasticity and porosity of sponge, the enzyme sponge complex is extremely suitable as a column filling. 2. Sponge is strongly hydrophilic. 3. Sponge contains reactive groups of the same type as those present in various enzymes, as a result of which linkage reactions are possible under mild conditions. 4. As a skeleton substance, sponge is especially resistant to microbiological and mechanical disintegration.

The term sponge generally includes any member of the invertebrate phylum Porifera, a group of aquatic animals characterized by a porous skeleton of interlocking spicules, glasslike rods, or horny fibers. Commercial sponges, which are the type used herein, comprise the skeletons surrounding the numerous cells of the sponge animal, and are usually obtained from the genera Spongia or Euspongia, and Hippospongia. In commercial sponges, the horny skeletal fibers are composed of spongin, a plastic-like material, which is an organic substance and consists mainly of proteins.

These proteins are built up from a great number of amino acids, as is shown in Table I.

Table I

| Analysis of a typical sponge produced the following values: | | |
|---|---|---|
| N content | 14.1% | |
| Active H (free carboxyl) | 0.6 meq/g | |
| $H_2O$ content | 9.2% | |
| Amino acid composition: | | |
| Amino Acid | % by weight/g of sponge | in Mole/gram |
| Cysteine | 1.15 | 0.095 |
| Aspartic acid | 10.3 | 0.77 |
| Methionine | 0.42 | 0.028 |
| Threonine | 2.48 | 0.208 |
| Serine | 1.86 | 0.177 |
| Glutamic acid | 8.3 | 0.565 |
| Proline | 5.7 | 0.496 |
| Valine | 2.48 | 0.212 |
| Isoleucine | 2.05 | 0.156 |
| Leucine | 2.59 | 0.198 |
| Tyrosine | 0.51 | 0.028 |
| Phenylalanine | 1.28 | 0.078 |
| Lysine | 3.7 | 0.253 |
| Hystidine | 0.42 | 0.027 |
| Arginine | 6.3 | 0.362 |
| Glycine | 6.5 | 2.20 |
| Alanine | 5.4 | 0.607 |

The above analysis clearly establishes which functional groups are present in the side-chains of the sponge proteins. Thus there are carboxyl-, amide-, amino-, and guanidine-groups, as well as thiol-, hydroxy-, and imidazole-groups.

Depending upon the nature of these groups, various known methods can be selected from the field of peptide chemistry to bond chemically or complex the enzyme to the sponge.

Among the methods for bonding the enzyme to the sponge, particularly preferred methods include the azide method, the carbodiimide method, bonding with anhydrides, the cyanogen bromide method, bonding by means of cyanuric chloride or its derivatives, bonding of tyrosine-containing enzymes by diazotization of various aminophenyl derivatives, and bonding by means of isothiocyanates or suitable fluoronitroaryls, such as 2,4-dinitro-1-fluorobenzene. These methods are well known to those skilled in the art and are thoroughly described in the literature.

Thus in the azide peptide synthesis, the free carboxyl groups of the protein are ultimately converted to the corresponding azide with nitrous acid, or alternatively with n-butyl nitrite or nitrosyl chloride. t-Butyl nitrite can also be used. When this latter material is used, hydrogen chloride is usually included. These reactions can be generally carried out in a suitable solvent, in particular tetrahydrofurane and dimethylformamide. The reaction scheme is outlined below:

Azide Coupling Method

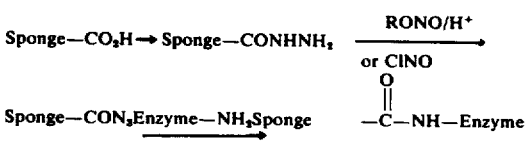

Sponge—$CO_2H$ → Sponge—$CONHNH_2$ $\xrightarrow[\text{or ClNO}]{RONO/H^+}$

Sponge—$CON_3$ $\xrightarrow{\text{Enzyme—}NH_2}$ Sponge—$\overset{O}{\overset{\|}{C}}$—NH—Enzyme Where:
R=$n$—C$_4$H$_9$
  $t$—C$_4$H$_9$ In the carbodiimide method, a suitable carbodiimide, such as dicyclohexylcarbodiimide or 1-cyclohexyl-3-(2-morpholinoethyl)-carbodiimide, are used as dehydrating agents for the formation of a peptide linkage. Generally, the reaction can be run in suitable inert solvents, such as a mixture of acetonitrile and tetrahydrofurane. 1-Cyclohexyl-3-(2-morpholinoethyl)-carbodiimide is especially useful since the corresponding urea derivative that forms is soluble in dilute acid and therefore is readily separated from the enzyme complex. Methylene chloride is a preferred solvent with the latter reagent. The reaction sequence is outlined below:

Carbodiimide Coupling Method

Sponge—CO$_2$H + Enzyme—NH$_2$ $\xrightarrow{C_6H_{11}N=C=N-C_6H_{11}}$ $$\text{Sponge}-\overset{O}{\underset{\|}{C}}-NH-\text{Enzyme} + C_6H_{11}-NH-\overset{O}{\underset{\|}{C}}-NH-C_6H_{11}$$

The enzyme may also be coupled to the sponge by the cyanogen bromide method. In that case the sponge is first reacted with a compound possessing two vicinal hydroxyl groups and a substituent capable of reacting with the amino groups or carboxylic groups of the sponge. In the next step, the modified sponge thus obtained is reacted with cyanogen bromide, resulting in the formation of an intermediate which will readily react with an amino group of the enzyme. See Acta Chimica Scandinavica 24, 2084 (1970); Nature 214, 1302 (1967) or Nature 215, 1491 (1961).

Coupling may also be effected by providing the sponge with a substituent possessing a fluoro-nitro-aryl group such as e.g. a 4-fluoro-3,5-dinotrophenyl group, and subsequently reacting this modified sponge with an enzyme, thus coupling an amino group of the enzyme to the nitro-substituted phenyl radical.

Yet another method of effecting a link between the sponge and the enzyme is to provide the sponge with a substituent possessing an aminophenyl group and to convert the aminophenyl group into a phenyldiazonium group, after which the modified sponge is reacted with an enzyme which contains tyrosine units. In this case the enzyme is linked to the sponge through a diazo-bond.

In forming the peptide linkage by means of the anhydride method, a suitable alkyl chloroformate, such as iso-butyl chloroformate or sec-butyl chloroformate, is reacted with the sponge in a suitable solvent, such as toluene or tetrahydrofurane, in the presence of a sufficient amount of a tertiary alkyl amine, such as triethylamine, resulting in a mixed anhydride group being attached to the sponge. Reaction of the modified sponge intermediate with enzyme provides the enzyme complex. The reaction is shown schematically below:

Anhydride Coupling Method

Sponge—CO$_2$H + ClCO$_2$C$_4$H$_9$ $\xrightarrow{(C_2H_5)_3NH_2}$ $$\text{Sponge}-\overset{O}{\underset{\|}{C}}-O-\overset{O}{\underset{\|}{C}}-\text{Butyl} \xrightarrow{\text{Enzyme-NH}_2}$$

$$\text{Sponge}-\overset{O}{\underset{\|}{C}}-NH-\text{Enzyme}$$

A similar reaction can be carried out using tetraethyl pyrophosphite instead of the chloroformate. Another pyrophosphite that can be used is bis-o-phenylene pyrophosphite.

As can be seen above, the enzymes can be chemically bonded directly to the sponge. It has been found, however, that optimum results are obtained by first modifying the sponge by attaching functional groups to it and thereafter bonding the enzymes to these groups.

Modification of the sponge may be effected by increasing the number of carboxyl groups, for instance by modifying basic groups of the sponge, such as amino and guanidine groups, with cyclic acid anhydrides. Hydroxyl groups in the sponge can also be reacted with these reagents. The modification may be carried out in a simple manner by reacting the sponge in a suitable inert solvent with a cyclic acid anhydride at normal or elevated temperatures. Preferred solvents are tetrahydrofurane, p-dioxane, dimethylsulphoxide, and dimethylformamide. Of the cyclic acid anhydrides, succinic acid anhydride, phthalic acid anhydride and maleic acid anhydride are preferred, with succinic acid anhydride being especially preferred. $\alpha$-Lower alkyl substituted succinic acid anhydrides can also be used containing up to about 3 carbon atoms in the alkyl substituent. Additionally, cis-1,2-cyclopentane dicarboxylic acid anhydride and the cis- and trans-1,2-cyclohexanedicarboxylic acid anhydrides can be used as well.

Prior to this modification, the number of reactive amino groups on the sponge may be increased by converting some of the carboxylic acid amide groups of the sponge to, for instance, hydrazide groups, or alternatively, by reacting the sponge with a suitable diamine, such as aminobispropylamine, further chains built up of several units may be attached to the sponge. While the preferred diamine for this purpose is iminobispropylamine (3,3'-diaminodipropylamine), the long chain diamines can be used as well. Also preferred are diethylenetriamine and triethylene tetramine. These chains may also contain carboxyl groups as the terminal groups whereby one or more enzymes, more particularly complex enzymes, can then be bound chemically or physically to the sponge. As a result of bonding the enzyme to the sponge by means of such chains, the complex becomes more accessible to, for instance, high-molecular substrates. The units with which the chains are built up may be so chosen so that chains may be attached both to the basic and the acid groups of the sponge, e.g. free amino and carboxyl groups. Depending upon the length of the chain desired, the chains can be easily synthesized, for example, by alternately linking diamines and cyclic dicarboxylic acid anhydrides. For example, on one preferred embodiment of the invention, the amide groups of the sponge are converted into —CO—NHNH$_2$ groups by treatment of the sponge with hydrazine hydrate. Thereafter, the latter groups are then reacted with succinic acid anhydride. In reacting with the —NH$_2$ group of the —CO—NHNH$_2$ groups there are thus formed terminal carboxyl groups. Further treatment of the sponge with additional succinic acid anhydride results in reaction of the free amino groups of the sponge with the additional succinic anhydride.

The resultant terminal carboxyl groups on the chains are then condensed with iminobispropylamine by means of 1-cyclohexyl-3-(2-morpholinoethyl)-carbodiimide. The use of this latter reagent also results in the reaction of the free carboxyl groups of the sponge itself.

Further treatment with succinic acid anhydride results in reaction with the terminal groups of the iminobispropylamine moiety to result in a product having terminal carboxyl groups.

It will be appreciated by those skilled in the art that the above sequence of reactions can be varied as desired, and it is not critical to the success of the invention that they be performed in any given sequence or order.

It should be also observed that the free amino groups on the sponge can be condensed with various enzymes by first reacting the free amino groups with another compound that will provide a functional group capable of being condensed with either the free amino or free carboxyl groups of the enzymes. For example, it is also possible to treat the sponge with glutaraldehyde whereupon the free amino groups are condensed with the aldehyde moiety giving a short chain having a free terminal aldehyde group, which can be condensed with the free amino groups of an appropriate enzyme.

Similarly, the free carboxyl groups of the sponge can be reacted with iminobispropylamine to give short chains having free amino groups, which can then be condensed with the free carboxyl groups of an appropriate enzyme.

A wide variety of industrial useful enzymes can be used to complex with the sponge. The more important enzymes that can be used in the invention include trypsin, papain, chymotrypsin, lactase, urease, acylase, invertase, catalase, $\alpha$-amylase, penicillin-amidase, $\beta$-amylase, lipase, cellulase, glucose oxidase, amyloglucosidase, protease, gelatinase, hemicullase, pectinase, lysozyme and pepsin, as well as glucoamylase.

The enzyme sponge complexes of the present invention can be used for a wide variety of purposes. Thus, acylase complex can be used for the D,L-separation of amino acids, the lactase complex can be used for the separation of lactose into galactose and glucose, the urease complex can be used for the decomposition of urea, in particular the urea occurring in waste water, and the catalase complex can be used for the decomposition of hydrogen peroxide.

The composition of the enzyme carrier complex can be readily calculated from the amino acid determination of the carrier, of the enzyme and of the enzyme carrier complex. The activity of the enzyme on the carrier as compared with a natural enzyme is a measure of the retention of the enzymatic activity of the bound enzyme. By enzyme activity, it is commonly understood by those skilled in the art to represent the number of millimoles of a substrate acted upon per minute under the influence of 1 mg of enzyme. For example, the activity of papain and trypsin is normally determined using benzoyl-arginine-ethyl ester as a substrate, regardless of whether or not the enzyme is associated with the carrier.

Similarly, the activity of $\alpha$-chymotrypsin is determined using a phenylalanine-ethyl ester as a substrate, while the activity of lactase ($\beta$-galactosidase) is determined with the use of o-nitrophenylgalactoside.

The following examples are provided to more fully describe the scope of the invention, but should not be construed as limiting it in any way.

EXAMPLE I

Sponge-Papain Complex

To 100 mg of ground sponge in a double-walled reaction vessel connected to a cryostat and provided with stirrer are added 25 ml of water. The temperature is maintained at 5°–7°C. The pH value is then adjusted to 3.9 with the aid of 5 N $H_2SO_4$. Subsequently, 85 mg (0.2 mmole) of N-cyclohexyl-N'-[$\beta$-(N-methyl-morpholino) ethyl]-carbodiimide-p-toluenesulphonate (CMECDI) are added and the mixture stirred for 15 minutes, while the pH value is maintained at 3.9. The carbodiimide reacts with the carboxyl groups of the sponge.

After the pH has been adjusted to 7, 250 mg of technical papain are added. While keeping the pH value constant at 7 (using, for example, an autotitrator 0.1 N NaOH), the reaction mixture is stirred for 2 hours, during which time the amino groups of the enzyme react with the carbodiime-substituted carboxyl groups of the sponge, whereby the urea derivative formed from the carbodiimide is eliminated.

The pH value is then reduced to 3.9 and, once again, 85 mg of CMECDI are added, followed by 15 more minutes of stirring at this pH. After the pH reaches a value of 7, stirring is continued for 14 hours at a constant pH of 7 and a temperature of 5°–7°C. The product is washed 20 times, alternately with 0.1 M NaCl and water.

The product thus obtained is freeze-dried to yield 63 mg of insoluble papain sponge complex having a content of 4 percent (g of enzyme per g of sponge) and an enzymatic activity of 125 percent referred to the free enzyme.

An enzymatic activity greater than 100 percent can be due to any one or more of the following reasons:

1. The substrate concentration at the carrier surface is larger than the substrate concentration in solution. This phenomenon occurs when the carrier and the substrate have opposite charges. 2. The starting enzyme is contaminated by other proteins or compounds which are not bound to the carrier. The starting enzyme, therefore, is purified by becoming transferred to the carrier. 3. Because of the enzyme being coupled to the carrier, a change in the conformation of the enzyme occurs, as a result of which the activity of the enzyme increases.

EXAMPLE II

Following the procedure of Example I, 82.8 mg of sponge-trypsin complex area prepared by reacting 250 mg of trypsin with 106 mg of sponge.

After analysis the content appears to be 3 percent and the enzymatic activity retained appears to be about 56 percent.

EXAMPLE III

Modification of sponge with succinic acid anhydride

One g of ground sponge, 1 g of succinic acid anhydride, and 50 ml of dimethyl sulphoxide are transferred to a reaction vessel provided with a stirrer and a cooler. The mixture is stirred for 2 days at 40°C under a nitrogen atmosphere, during which time the amino and hydroxyl groups of the sponge react with the succinic acid anhydride. Subsequently, the mixture is filtered and the residue successively washed 5 times with ethanol (96%) and 3 times with ether. After drying for 14 hours under vacuo over $P_2O_5$, 1.44 g of modified sponge are obtained, in which the active $H^+$ is 1.87 meq/g.

EXAMPLE IV

Bonding of trypsin to sponge modified with succinic acid anhydride

In the apparatus described in Example I, 100 mg of modified sponge obtained according to the process of Example III is added to 20 ml of water. The pH is adjusted to 3.9, and 85 mg of CMECDI are added to the mixture. After 15 minutes of stirring at 5°–7°C at a pH of 3.9, the pH value is raised to 7 with 1 N NaOH and 250 mg of trypsin are added to the reaction mixture. The mixture is stirred for 2 hours at 5°–7°C at a pH of 7, which is automatically kept at this value with the aid of 0.1 N NaOH.

At the end of this period the pH is decreased to 3.9, 85 mg of CMECDI are added, and the mixture stirred for 15 more minutes at this pH. The pH is then increased again to 7 and the reaction continued for 15 hours at this pH value and a temperature of 5°–7°C.

The reaction mixture is filtered and the trypsin-sponge complex washed 20 times, alternately with 0.1 M NaCl and water. After drying, 74.2 mg of a water-insoluble trypsin sponge complex is obtained which has a load factor of 23 percent and a retained enzymatic activity of 27 percent.

The thermostability of the trypsin complex that was obtained was measured and appears to be higher at a pH of 7.8 than that of the free trypsin. The thermostability is measured on the basis of the residual activity after heating for a certain period of time, as indicated in Table II.

Table II

| | | residual activity in % of the initial activity | |
|---|---|---|---|
| | | free trypsin | trypsin complex |
| 1. | After 10 minutes, 60°C pH 7.8 | 3.3 | 35 |
| 2. | After 10 minutes, 80°C pH 7.8 | 1.7 | 14 |

EXAMPLE V

Bonding of papain to sponge modified with succinic acid anhydride

In a manner similar to that described in Example IV, 91 mg of insoluble papain sponge complex are obtained by reacting 250 mg of papain with 100 mg of sponge modified with succinic acid anhydride.

This papain sponge complex has a load of 72% and a retained enzymatic activity of 38%.

EXAMPLE VI

Bonding of α-chymotrypsin to sponge modified with succinic acid anhydride

In a manner similar to that described in Example IV, 102 mg of insoluble α-chymotrypsin sponge complex are obtained by reacting 250 mg of α-chymotrypsin with 100 mg of sponge modified with succinic acid anhydride. The complex has a load of content of 13 percent and an enzymatic activity of 207 percent, as compared to the free enzyme.

EXAMPLE VII

Modification of a sponge by attachment of long chain aliphatic substituents a. In a reaction vessel 500 mg of sponge are stirred for 20 hours under a nitrogen atmosphere at 50°C with a solution of 2.0 g of hydrazine hydrate in 100 ml of water, whereby the amide groups in the sponge are converted into $CO-NH-NH_2$ groups. After the reaction, the product is washed with water.

b. The sponge prepared in (a.) is taken up in 30 ml of 0.1 M NaCl and 5 ml of methanol. At a pH of 4, 600 mg of succinic acid anhydride are added in small portions over a period of 7 hours, while the pH is maintained at 4 with 0.1 N KOH. After an additional hour of reaction, the pH is adjusted to 11.5 with 4 N NaOH. During the reaction the $CO-NH-NH_2$ groups react with the succinic acid anhydride. The product is washed with water, ethanol (96%), and then with ether.

c. The sponge obtained in (b.) is stirred for 14 hours at 40°–50°C with 600 mg of succinic acid anhydride in dimethylsulphoxide. During this reaction the amino groups in the sponge react with the succinic acid anhydride. After cooling, the product is filtered and washed successively with ethanol (96%), 0.1 N HCl, water, ethanol (96%), and finally with ether. After drying for 12 hours over $P_2O_5$, 616.4 mg of solid are obtained having an active $H^+$: 2.5 meg/gram.

d. To 400 mg of the sponge obtained in (c.) in 15 ml of water is added a solution of 1,310 mg of iminobispropylamine in 5 ml of water. After adjusting the pH to 3.9, 170 mg of CMECDI are added and the mixture stirred for 15 minutes, whereupon the pH increases to 7. After stirring for 2 more hours, the pH is again adjusted to 3.9 and 170 mg of CMECDI again added and the reaction mixture stirred for 15 minutes. After the pH value has been increased to 7, the mixture is stirred for 2 hours. The pH is adjusted to 3.9 and 170 mg of CMECDI are added and stirring conducted for 15 minutes. The pH is increased to 7 and stirring is carried out for 14 more hours at a constant pH value of 7.

By means of the CMECDI, the iminobispropylamine has now reacted with the carboxyl groups of the sponge itself, as well as the carboxyl groups formed by the coupling of the succinic acid anhydride.

The final product is washed sequentially 4 times with water, 2 times with 1 N NaOH, 4 times with water, 4 times with ethanol (96%), and 4 times with ether, to give 321 mg of product.

e. A mixture of 313 mg of the sponge obtained in (d.), 2 g of succinic acid anhydride, and 30 ml of dimethylsulphoxide is stirred for 48 hours at a temperature of 40°–50°C, during which time the succinic acid anhydride reacts with the terminal amine groups of the iminobispropylamine. After cooling and filtration, the product is washed with ethanol (96%) and then with ether. After drying over $P_2O_5$ under vacuum, 340 mg of final product is obtained having terminal carboxyl groups.

EXAMPLE VIII

Bonding of lactase to the modified sponge obtained according to Example VII with the aid of p-aminophenyl-β-D-thiogalactopyranoside Fifty mg of the modified sponge obtained in Example VII, 36 mg of the above-mentioned pyranoside, and 85 mg of CMECDI are reacted with stirring for 15 minutes according to the water-soluble carbodiimide method disclosed above at a pH of 3.9 at 5°–7°C. The mixture is stirred for an additional 45 minutes at a pH of 7, and the pH is again adjusted to 3.9. Eighty-five mg of CMECDI are added and the mixture stirred for 15 minutes, whereupon the pH increases to 7. The reaction mixture is stirred for 12 more hours, filtered and the sponge product washed with water.

The sponge product, which is modified with succinic acid carboxyl groups to which are coupled the reversible inhibitor pyranoside, is taken up in 20 ml of buffer solution having the following composition: 0.01 M mercapto-ethanol, 0.01 M $MgCl_2$ and 0.01 M potassium phosphate. The pH is adjusted to 7 with the 50% KOH, 500 mg of technical $\beta$-galactoside are then added and the mixture stirred for 3 hours. After filtration, the product is washed 20 times with a cold buffer solution of the above-mentioned composition, and then freeze-dried.

The product obtained (60 mg) has a load of 4 percent and a retained enzymatic activity of 3 percent.

EXAMPLE IX

Ground sponge (250 mg) is suspended in 15 ml of a cooled aqueous borate-buffer having a pH of 8.5. Fifteen ml of a cooled 25% aqueous glutaraldehyde solution are added with stirring and the mixture is reacted at about 0°C for 20 minutes. The solid substance is filtered and washed with 300 ml of the buffer solution. The solids are then suspended in 30 ml of an aqueous phosphate buffer having a pH of 7, and a solution of 200 mg of urease in 5 ml of the phosphate buffer is added. After a reaction time of 16 hours, the solids are filtered, washed extensively with an aqueous sodium chloride solution and freeze-dried. The product consists of 310 mg of an urease-sponge complex having an activity per mg of complex of 0.1 percent of the activity of the free enzyme per mg.

EXAMPLE X

A sponge is modified by reacting 1 g of ground sponge with 3 ml of iminobispropylamine in 8 ml of dimethylsulfoxide for 12 hours at 70°C. The reaction mixture is washed with ether and dried thoroughly under vacuum at 80°C. The dry product consists of about 0.5 g of modified sponge, containing an increased amount of free amino groups. The product gives an intense color reaction with ninhydrin.

The procedure of Example IX is repeated, using this modified sponge, and 177 mg of an urease-modified sponge complex are obtained, having an activity per mg of complex of 0.6 percent of the activity of the free enzyme per mg.

EXAMPLE XI

A small column is filled with 280 mg of the urease-sponge complex obtained in Example IX. A solution of 4.5 g of urea in 1.5 l of water at a temperature of about 18°C is continuously circulated through the column by means of a circulating pump. The pH of the solution is kept constant at 6.1 with 0.1 N hydrochloric acid.

The rate of hydrolysis of the urea is measured at regular intervals. After 250 hours of continuous operation, the hydrolysis rate still remains unchanged, showing that the activity of the complex has not diminished.

What is claimed is:
1. An insoluble enzyme complex comprising a natural sponge, an aquatic animal of the invertebrate phylum Porifera having a porous skeleton of horny skeletal fibers and containing spongin, which consists mainly of protein, to which is chemically bonded an enzyme.
2. The enzyme complex of claim 1 wherein the enzyme is bound to the natural sponge by means of a —CO—NH-group.
3. A process for preparing an insoluble enzyme complex which comprises chemically bonding one or more enzymes to a natural sponge, an aquatic animal of the invertebrate phylum Porifera having a porous skeleton of horny skeletal fibers and containing spongin, which consists mainly of protein.
4. The process of claim 3 wherein the enzyme is chemically bonded to the sponge by means of a —CO—NH-group.
5. The process of claim 4 wherein the —CO—NH-group is formed by reacting the sponge with the enzyme in the presence of an organic carbodiimide.
6. A process for preparing an insoluble enzyme complex which comprises the steps of:
 a. modifying a natural sponge by treating it with a cyclic anhydride, said sponge being an aquatic animal of the invertebrate phylum Porifera having a porous skeleton of horny skeletal fibers and containing spongin, which consists mainly of protein; and
 b. chemically bonding the modified sponge obtained in (a) to an enzyme by means of a —CO—NH-bond.
7. A process for preparing an insoluble enzyme complex which comprises the steps of:
 a. modifying a natural sponge by treating it with a cyclic dicarboxylic acid anhydride, said sponge being an aquatic animal of the invertebrate phylum Porifera having a porous skeleton of horny skeletal fibers and containing spongin, which consists mainly of protein;
 b. reacting the modified sponge obtained in (a) with a diamine;
 c. further reacting the product obtained in (b) with a cyclic dicarboxylic acid anhyride; and
 d. reacting the modified sponge obtained in (c) with an enzyme.
8. A process for preparing an insoluble enzyme complex which comprises the steps of:
 a. modifying a natural sponge with hydrazine whereby a portion of the —CO—NH-bonds of the sponge are converted to —CO—NH—$NH_2$ groups, said sponge being an aquatic animal of the invertebrate phylum Porifera having a porous skeleton of horny skeletal fibers and containing spongin, which consists mainly of protein;
 b. treating the modified sponge obtained in (a) with a cyclic dicarboxylic acid anhydride,
 c. further treating the sponge obtained in (b) with a diamine in the presence of a carbodiimide;
 d. further treating the modified sponge obtained in (c) with cyclic dicarboxylic acid anhydride; and
 e. treating the sponge obtained in (d) with an enzyme to provide the insoluble enzyme complex.

* * * * *